May 10, 1960   H. W. ROCKWELL   2,936,039
VEHICLE STEERING AND CONTROL APPARATUS
Filed March 23, 1959   4 Sheets-Sheet 4

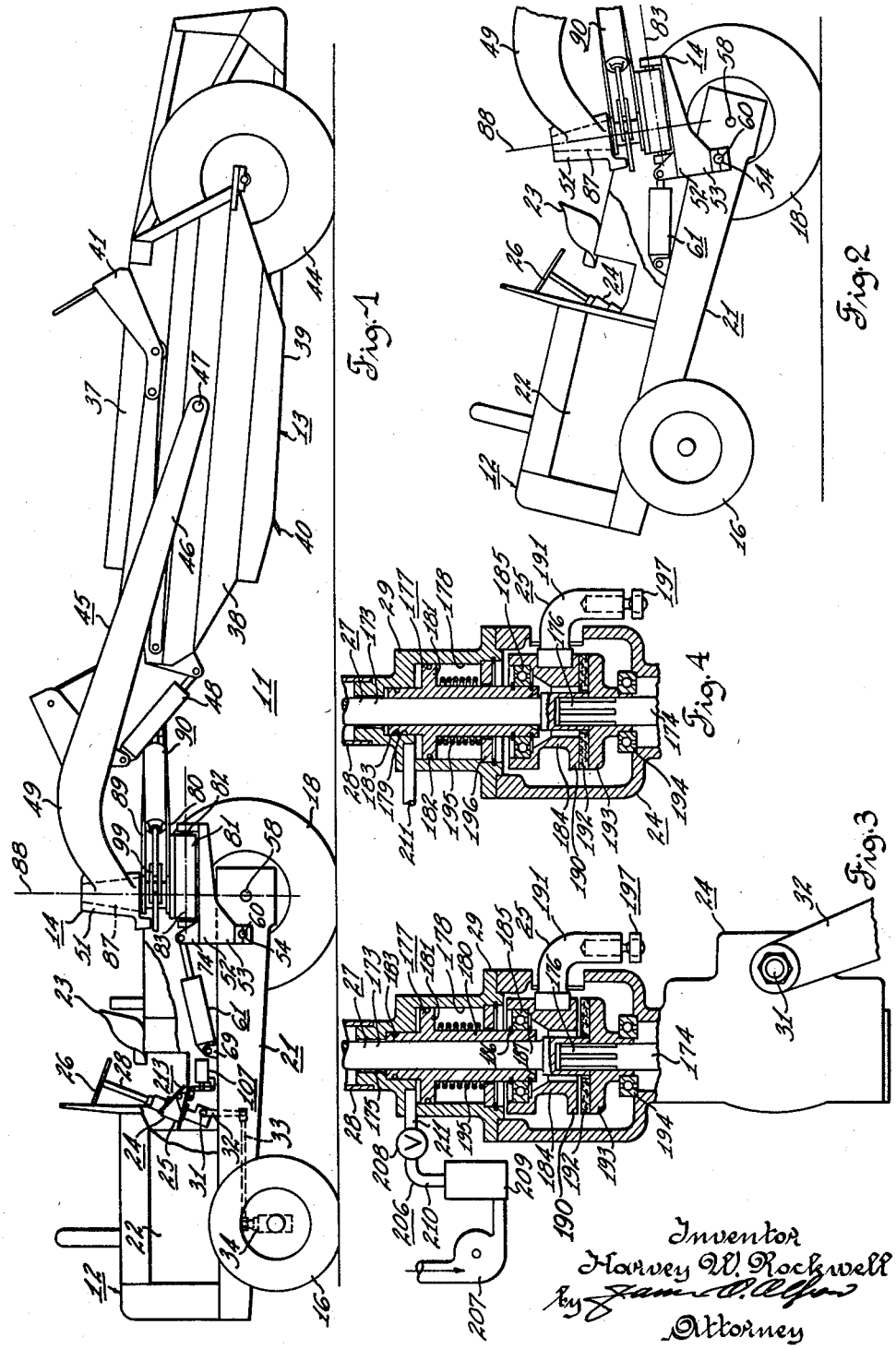

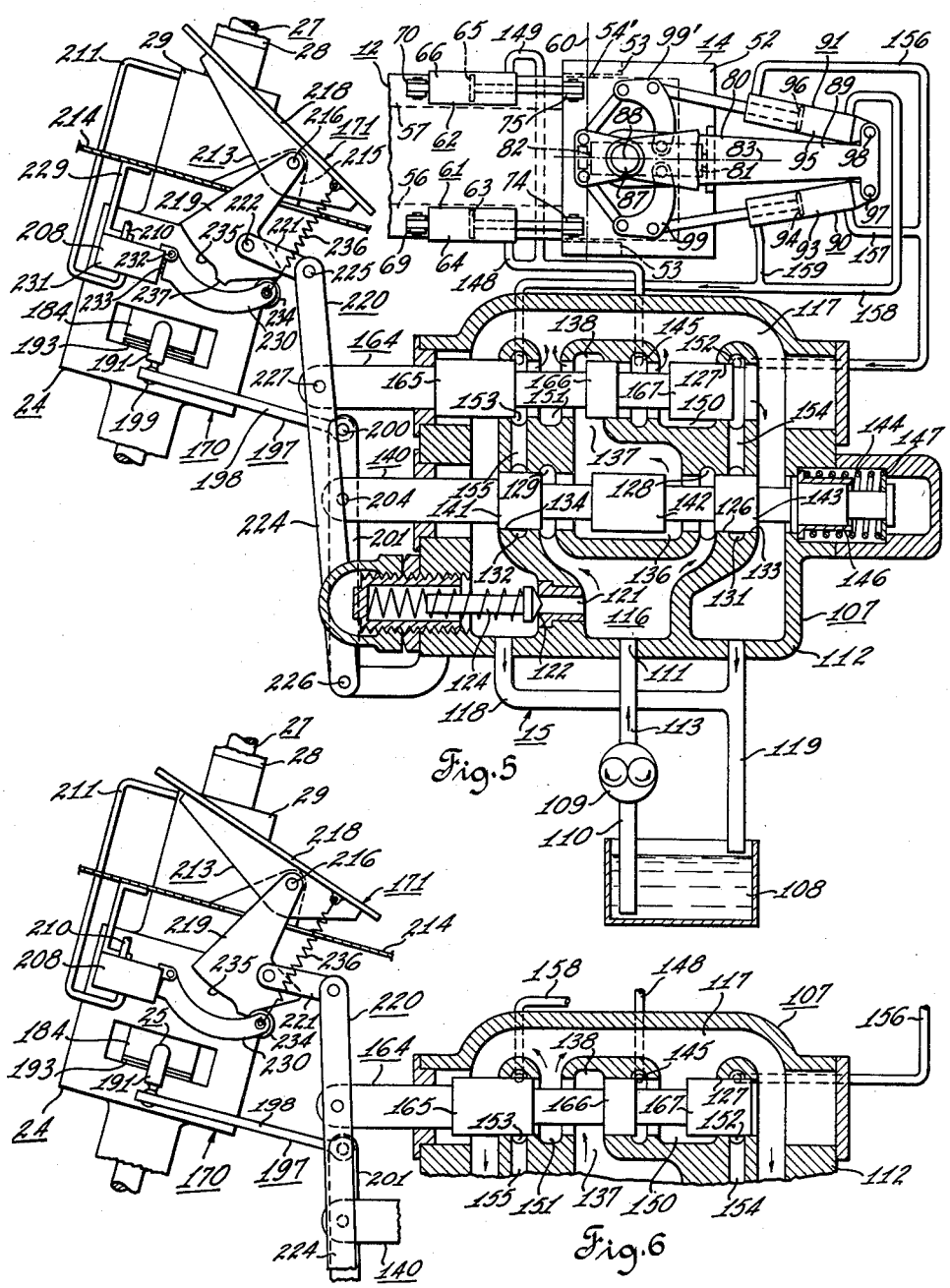

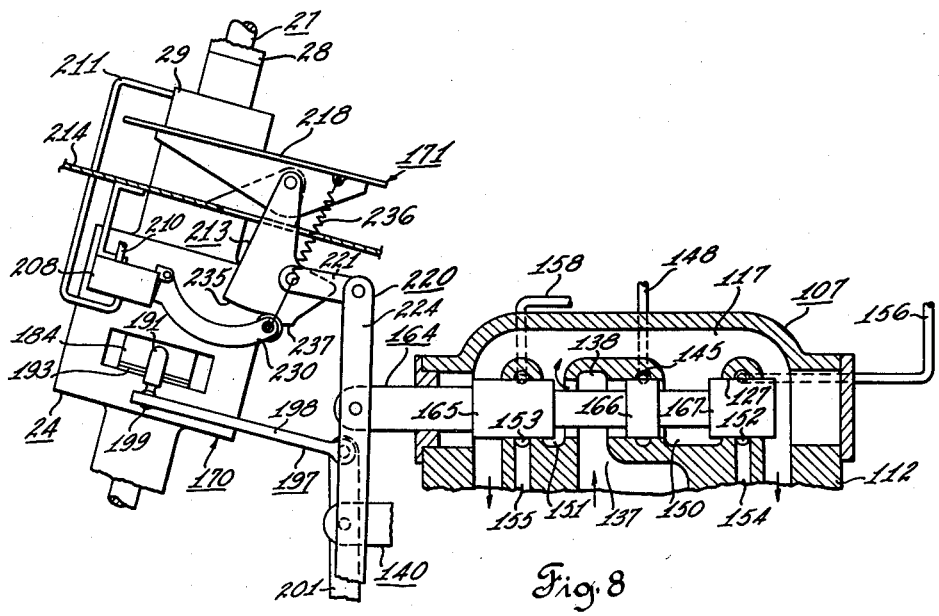
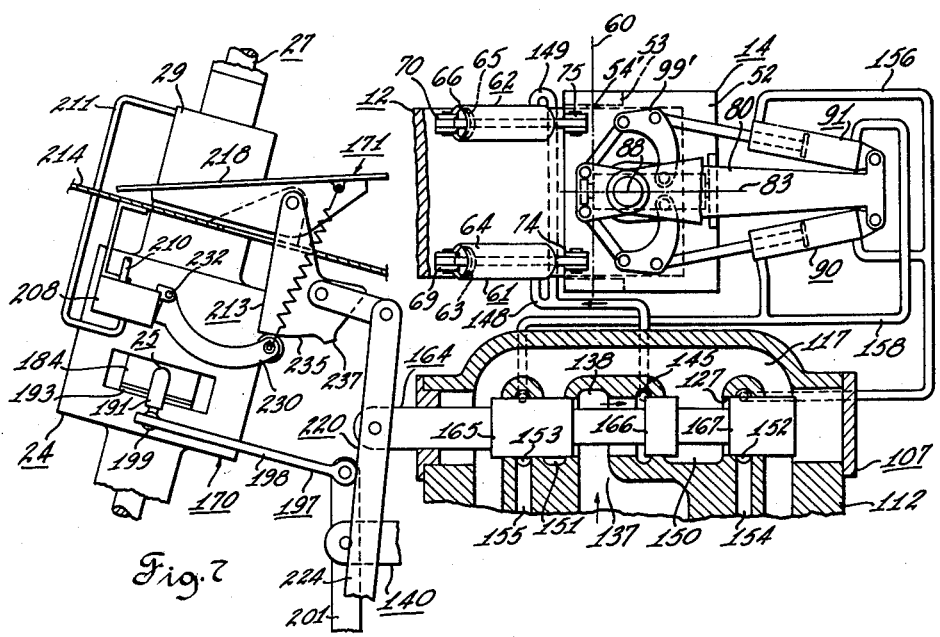

Inventor
Harvey W. Rockwell
By James C. Alfson
Attorney

United States Patent Office 2,936,039
Patented May 10, 1960

2,936,039

VEHICLE STEERING AND CONTROL APPARATUS

Harvey W. Rockwell, Cedar Rapids, Iowa, assignor to Allis-Chalmers Manufacturing Company, Milwaukee, Wis.

Application March 23, 1959, Serial No. 801,221

12 Claims. (Cl. 180—79.2)

This invention relates generally to a steering and weight transfer control apparatus for an articulated self-propelled earth working vehicle of the type adapted to operate as a three axle vehicle and as a two axle vehicle alternatively. More specifically this invention relates to a manually operated weight transfer control device for actuating a hydraulic motor system to convert a two axle tractor and a single axle trailer from a three axle to a two axle vehicle; and also relates to a manually operated steering device whose operation is coordinated with said weight transfer device for providing steering control of the tractor's steerable wheels while operating as a three axle vehicle and for providing manual steering control of an auxiliary wagon type steering system that guides the vehicle during two axle operation.

When a two axle tractor unit and single axle trailer unit of the character described operate as a three axle vehicle, steering is accomplished by means of the tractor front wheels which are controlled by the usual manually operated steering assembly. A three axle vehicle of this type is usually converted into a two axle vehicle by actuating a hydraulic weight transfer jack that is operatively interposed between the tractor and trailer and which is effective when actuated to raise the tractor's steerable front wheels off the ground. Two axle operation of the vehicle is usually resorted to in order to obtain better maneuverability and increased tractive power. This increase of tractive power is, of course, due to the fact that the weight normally supported by the tractor's front wheels is transferred to the traction or driving wheels of the tractor.

After conversion into a two axle vehicle has taken place, some form of wagon type steering is usually employed to guide the tractor and trailer. For example, one well known form of wagon type steering incorporates a double acting hydraulic jack interposed between the tractor unit and trailing unit for controlling the angular relationship about a vertical pivot axis.

A steering and weight transfer control apparatus to operate the steering and weight transfer systems for a vehicle of this type must be designed to enable a driver to manipulate as few manual controls as possible and yet enable him to have complete control of the vehicle at all times. Also, to be commercially feasible the manual controls should be designed so that they will be easy to manipulate and be readily familiar to drivers experienced in operating the more conventional automotive type earth moving vehicles. This tends to minimize the need for extensive driver training in order to qualify proficient operators.

It is, therefore, an object of the present invention to provide a steering and control apparatus of the character described which will take care of the requirements hereinbefore described in an entirely satisfactory manner.

It is a further object of this invention to provide a steering mechanism, for a vehicle of the character described, which is effective to control the tractor's steerable front wheels while operating as a three axle vehicle and which includes an auxiliary steering actuating device to be automatically activated when the tractor and trailer operate as a two axle vehicle.

It is a further object of this invention to provide an improved steering apparatus, for a vehicle of the character described, wherein a single manually operative steering shaft guides the tractor and trailer during operation as a three axle vehicle and also manipulates the auxiliary wagon type steering system during operation as a two axle vehicle.

It is a further object of the invention to provide a unitary steering apparatus with a single hand wheel to guide the tractor and trailer during operation as either a three axle vehicle or a two axle vehicle and which is coordinated with the weight transfer control mechanism whereby the auxiliary steering mechanism is automatically engaged upon operation of the weight transfer control mechanism.

It is a further object of the invention to provide a vehicle of the character described with a foot pedal for actuating the weight transfer system and wherein actuation of the weight transfer pedal automatically connects an auxiliary steering actuating lever with the manually operable steering shaft, the latter being operative to control the steerable tractor wheels during operation as a three axle vehicle and the wagon type steering during operation as a two axle vehicle.

These and other advantages and objects will become apparent to those skilled in the art when the following description is read in conjunction with the appended drawings in which:

Fig. 1 shows a schematic side view of a three axle vehicle including a two axle tractor unit articulated with a single axle scraper unit, a portion of the tractor body being cut away to show the location of the manually operated steering and weight transfer control apparatus;

Fig. 2 shows the three axle vehicle of Fig. 1 converted into a two axle vehicle wherein the tractor unit is tilted with respect to the scraper unit so that its front wheels are raised off the ground;

Fig. 3 shows the manually operated steering apparatus for guiding the tractor's steerable front wheel during three axle operation and for controlling the auxiliary wagon type steering system during two axle operation, also diagrammatically shown is the air pressure system for activating the auxiliary steering control mechanism;

Fig. 4 shows a sectional view of the manual steering apparatus of Fig. 3 with the auxiliary steering control mechanism in the activated condition;

Fig. 5 shows the hitch mechanism for the vehicle of Fig. 1 and also shows a diagrammatic view of the hydraulic system including the control valving which is manipulated by the steering and weight transfer control apparatus, the hydraulic system being disposed in the steering "float" and weight transfer "float" position;

Fig. 6 shows the disposition of the weight transfer control apparatus adjusted to activate the auxiliary steering mechanism and placing the hydraulic control valving in the steering "hold" weight transfer "float" position;

Fig. 7 shows the disposition of the hitch mechanism and the steering and weight transfer control apparatus when the hydraulic control valving is in the weight transfer "raise" steering "hold" position;

Figure 9:
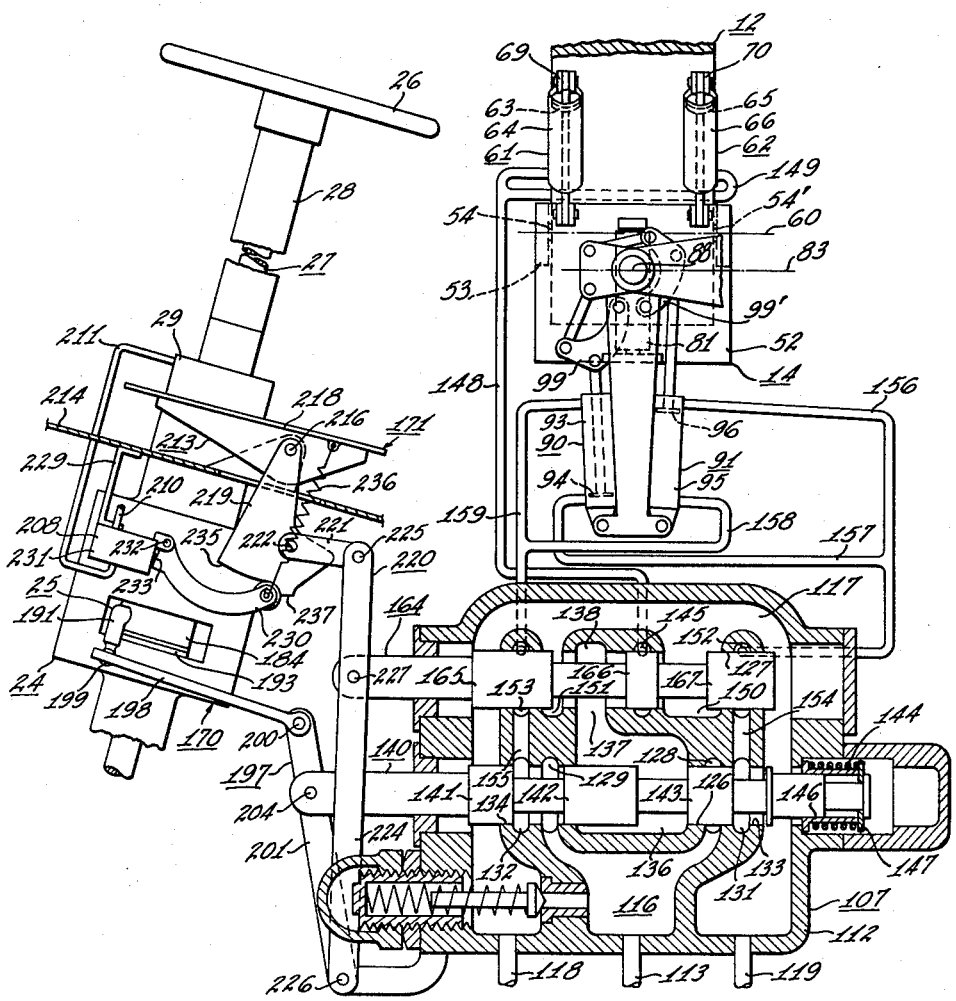

Fig. 8 shows the weight transfer actuating pedal being held by a detent means in an intermediate position with the hydraulic control valving disposed in the weight transfer "hold" auxiliary steering "hold" position; and Fig. 9 shows the hitch mechanism and the weight transfer valve and weight transfer control apparatus in the intermediate or weight transfer "hold" position, as shown in Fig. 8, with the steering control apparatus placing the steering valve system in the "right turn" position.

Referring to Figs. 1, 2 and 5, the new and useful steering and weight transfer control apparatus 170 that will be disclosed and claimed herein is particularly adapted to operate a fluid pressure system that has been tailored to meet the requirements of the articulated self-propelled earth working vehicle 11. This vehicle is designed to be operated as a three axle vehicle at higher speeds and low traction requirements and as a two axle vehicle at lower speeds and high traction requirements. Vehicle 11 is comprised of a tractor unit 12 which is articulated with a scraper unit 13 by means of a hitch mechanism 14. The relationship of the steering and control apparatus 170 and fluid pressure system 15, best shown in Fig. 5, will be described in detail hereinbelow.

Referring to Figs. 1 and 2, tractor unit 12 is a two axle type particularly suited for drawing scraper 13 and includes a pair of front inflated rubber tired dirigible steering wheels 16, only one of which is shown, and a pair of inflated rubber tired driving or traction wheels 18, only one being shown. The tractor wheels are carried on the main frame 21 in the conventional manner. Main frame 21 of the tractor is a unitary structure which carries a forward mounted engine 22; a conventional power train for driving the traction wheels 18 which includes transmission and differential gearing, not shown, and an operator's station 23.

Tractor 12 is guided by means of steerable wheels 16 which are controlled by a steering apparatus 24, shown also in Figs. 3 and 4. Steering apparatus 24 includes the usual steering hand wheel 26 which is fixed on a steering post or shaft 27, shown best in Figs. 3 and 4. Shaft 27 is carried within the usual steering column 28 attached on a support housing 29 which in turn is supported on the tractor main frame 21. Steering apparatus 24 also includes an auxiliary steering mechanism 25 which will be described in detail hereinbelow.

An output or rock shaft 31 is journaled in housing 29 and is drivingly connected with the manually operable steering shaft 27 by means of the conventional worm gearing, not shown. A pitman arm 32 is carried on rock shaft 31 and is connected by means of a connecting rod 33 with the steering knuckle assembly 34 which is of the well known Ackerman type. A power assist, not shown, may also be incorporated into the Ackerman steering linkage in the conventional manner for augmenting the steering of the dirigible tractor wheels 16. From the foregoing it will be readily seen that shaft 31, arm 32, rod 33 and assembly 34 together form a motion translating means for interconnecting steering shaft 27 with the steerable ground wheel 16.

Referring to Fig. 1, the scraper unit is of the conventional single axle type having an earth receiving bowl 37; a pair of laterally opposite side walls 38, only one of which is shown; and a bottom 39 which at its forward end is provided with a cutting blade 40. The rear of the bowl 37 is normally closed by the ejector 41 which is adapted to be moved forward through the bowl to discharge, in the conventional manner, material that has been collected therein. The front of the scraper bowl is closed by an apron, not shown, which is also of conventional design being pivoted to the ejector 41 and movable between a closed and an open position.

Bowl 37 is supported adjacent its rearward end by a pair of transversely spaced inflated rubber tired ground engaging wheels 44, only one of which is shown. The forward end of bowl 37 is supported by a yoke or draft frame 45 which includes a pair of side arms 46, only one being shown, pivotally connected respectively to the side walls 38 by means of pins 47, only one of which is shown. Bowl 37 is adapted to be lowered into a loading position and raised to a travel position in the usual manner by means of a double acting hydraulic jack 48. The forward end of the draft frame 45 is provided with the well known gooseneck 49, the forwardmost portion of which carries a king pin housing 51 for connecting the scraper unit 13 with the hitch mechanism 14.

Referring to Figs. 1, 2 and 5, hitch mechanism 14 is designed to permit tractor 12 to be articulated with scraper 13 about a vertical pivot axis, a transverse horizontal pivot axis and a longitudinal pivot axis. Hitch mechanism 14 comprises a base plate member 52 having a pair of journal brackets 53 connected by means of pins 54 and 54' on the opposite lateral side beams 56 and 57 of the tractor main frame 21. Pins 54 and 54' are positioned forwardly of and slightly above the rear axle 58 of the tractor and share a common horizontal axis 60, best shown in Fig. 5, extending transversely of the tractor, about which plate 52 may swing.

A pair of single acting hydraulic weight transfer jacks 61 and 62, which are part of the hydraulic system are operatively interposed respectively between the tractor main frame 21 and the base plate 52. Jack 61 is of conventional design and includes a ram element 63 which is extendible and retractable within cylinder element 64; and jack 62 includes a ram element 65 which is extendible and retractable within cylinder element 66. Cylinders 64 and 66 are respectively pivotally connected to the tractor main frame side beams 56 and 57 at 69 and 70; and the rams 63 and 65 are pivotally connected respectively to opposite sides of base plate 52 at 74 and 75. Although the base plate 52 is free to pivot about pivot axis 60, it may be restrained by action of the weight transfer jacks 61 and 62.

The combination of jacks 61 and 62 with the tractor main frame and with the hitch mechanism in effect comprises a weight transfer system. The operation and control of this system will be described in further detail hereinbelow in conjunction with steering and control apparatus 170 and hydraulic system 15.

A second hitch member 80 includes a sleeve portion 81 which is carried on the base plate 52 by means of pin 82 which provides a horizontal pivot axis 83 extending longitudinally of tractor 12. Hitch member 80 is free to oscillate about axis 83 through a limited arc. An upstanding king pin 87 is rigidly carried on the sleeve portion 81 and provides a vertical pivot axis 88 which is perpendicular to pivot axis 83. The king pin 87 is journaled by suitable bearings within king pin housing 51 of the draft frame to permit relative angling of the scraper unit with respect to the tractor unit about pivot axis 88.

An elongated subframe structure 89 is rigidly connected on the sleeve portion and extends rearwardly of the king pin 87 and underneath the arc of gooseneck 49. Subframe 89 carries a pair of double acting hydraulic steering jacks 90 and 91 that serve as the motor means for the auxiliary wagon type steering.

The hydraulic pressure cylinders 93 and 95 of jacks 90 and 91 are pivotally connected respectively in thrust transmitting relationship with the rearward portion of the subframe 89 by means of vertical pivot pins 97 and 98. Rams 94 and 96, respectively, are relatively expansible and contractible with cylinders 93 and 95 and are connected respectively to the king pin housing by means of the thrust transmitting linkages 99 and 99'. During normal three axle operation of vehicle 11 rams 94 and 96 float within cylinders 93 and 95 permitting scraper 13 to articulate freely with tractor 12 about pivot axis 88. Jacks 90 and 91, however, are hydraulically locked automatically by the hydraulic system whenever the weight transfer system is actuated by apparatus 170 for converting the tractor and scraper into a two axle vehicle.

The combination of jacks 90 and 91 with the hitch mechanism 14 and with draft frame 45 in effect comprises an auxiliary wagon type steering system. The control and operation of this system will be described in further detail hereinbelow in conjunction with apparatus 170 and hydraulic system 15.

Hydraulic system 15, which is the operation of steering and control apparatus 170, is also disclosed in a copending application of R. M. Anderson Serial No. 795,509 filed Feb. 25, 1959 entitled Hydraulic Control System. This system is especially adapted for synchronizing the operation of the weight transfer system with the operation of the auxiliary wagon type steering system. This synchronizing is accomplished by means of a two spool hydraulic control valve 107 which in effect has two separate control valve systems, one serving as a weight transfer valve system for controlling the single acting weight transfer jacks 61 and 62 and the second serving as a steering valve system for controlling the operation of the auxiliary steering jacks 90 and 91.

In order to fully disclose the best known means for performing the present invention the details of hydraulic system 15 will now be briefly described. Hydraulic system 15 includes control valve 107, a hydraulic fluid reservoir 108 and an engine driven hydraulic pump 109 which receives fluid from the reservoir by means of an intake conduit 110. Pump 109 delivers pressurized hydraulic fluid to the pump port 111 of a two spool control valve housing 112 by means of conduit 113. Pump port 111 in turn communicates with an inlet chamber 116 formed within housing 112 of control valve 107. An exhaust passage 117 is formed by the interior walls of valve housing 112. Hydraulic fluid is returned from exhaust passage 117 to reservoir 108 by means of return conduits 118 and 119.

Interconnecting the inlet chamber 116 and exhaust passage 117 is a relief passage 121 having a relief port 122 for seating a spring loaded relief valve 124. Relief valve 124 is of the conventional design and construction and serves to prevent an undesirable pressure build up by opening the inlet chamber 116 for fluid communication with the exhaust chamber 117 in response to excessive pressure within chamber 116.

Control valve 107 in effect has two separate control valve systems, one serving as a weight transfer valve system for controlling the single acting weight transfer jacks 61 and 62 and the second serving as a steering valve system for controlling the operation of the auxiliary steering jacks 90 and 91.

A pair of spaced parallel valve spool bores 126 and 127 are formed respectively within housing 112. Valve spool bore 126 is a basic part of the auxiliary steering control valve system and has formed therein a pair of spaced annular inlet ports 128 and 129; a pair of annular load ports 131 and 132; a pair of exhaust ports 133 and 134 formed respectively at the intersection of the bore 126 and the exhaust chamber 117; and an annular outlet port 136. Port 136 is connected by a cross passage 137 with an annular inlet port 138 formed within bore 127.

Carried in bore 126 is an elongated valve spool 140 having a series of land portions 141, 142 and 143 formed thereon for controlling interport flow within bore 126 in the usual manner. A biasing spring 144 is carried on one end of spool 140 and is confined between slidable sleeve 146 and flange member 147. Sleeve 146 and flange 147 in turn transmit thrust between the valve spool and housing 112 to effectively center spool 140 in the position shown in Fig. 5.

Bore 127 is a basic part of the weight transfer control valve system and has an annular load port 145; and an inlet port 138. Port 145 is interconnected for fluid communication with cylinders 64 and 66 of weight transfer jacks 61 and 62 by means of conduits 148 and 149. Also formed within bore 127 are a pair of annular exhaust ports 150 and 151; and a pair of annular relay ports 152 and 153. Ports 152 and 153, respectively, are cross connected for communication with load ports 131 and 132 by means of cross connecting passages 154 and 155 formed within housing 112. Both of ports 152 and 153 are also cross connected for fluid communication with one end of each of cylinders 93 and 95, respectively, by means of conduits 156 and 157, and conduits 158 and 159.

A valve spool 164 having land portions 165, 166 and 167 is carried within bore 127 for controlling interport flow therein the usual manner. Because relay ports 152 and 153 and load ports 145 are all located within the valve bore 127, valve spool 164 is operative to control a "float" and a "hold" position for the auxiliary steering jacks 90 and 91, as well as the weight transfer jacks 61 and 62 which will be more fully explained hereinbelow.

*Steering and weight transfer control apparatus*

Referring to Figs. 3, 4 and 5, the manually actuated vehicle steering and control apparatus 170 comprises a weight transfer actuating mechanism 171 and a steering mechanism 24. Actuating mechanism 171 provides a means for manually adjusting the weight transfer valve spool 164 to operate the weight transfer jacks 61 and 62. Steering mechanism 24 provides a means for guiding the tractor front wheels in a conventional manner during three axle operation of the vehicle, and also incorporates an auxiliary steering mechanism 25 for adjusting the steering valve spool 140 which controls steering jacks 90 and 91 during two axle operation.

Referring to steering mechanism 24, best shown in Figs. 3 and 4, steering shaft 27 includes an upper shaft 173, one end of which is journaled within housing 29 by suitable bearings 175 and is drivingly connected with a lower shaft 174 by means of a splined connection at 176. Shaft 174 is drivingly connected with rock shaft 31 by means of conventional worm gearing, not shown.

An air pressure cylinder 178 is formed by the interior walls of housing 29 coaxial with the steering shaft 27. A piston member 177 includes a sleeve portion 180 coaxially carried on the shaft 173; and a radial flange formed on sleeve 180 forms a piston 181 which is slidably carried within cylinder 178. An air tight seal is provided between piston member 177 and cylinder 178 by means of an O-ring 182 carried on piston 181 and O-ring 183 carried on the one end of sleeve 180 which is received in bore 179 of housing 29. A clutch member 184 is rotationally carried on sleeve 180 by means of ball bearings 185 and is held in axially fixed thrust transmitting relationship therewith by means of retainer rings 186 and 187. Clutch member 184 has a radial flange which serves as a first clutch plate 190. Integrally fixed on clutch member 184 is an auxiliary steering actuating lever 191 which is operative to transmit motion to adjust the axial displacement of valve spool 140.

A second clutch plate 193 is splined on the lower steering shaft 174 and is complementary to and engageable with clutch plate 190. Downward thrust on clutch plate 193 will be resisted by housing 29 through ball bearings 194, the latter also serving to rotationally support shaft 174. A spring 195 reacts between a spring retainer 196 and piston 181 to urge piston member 177 axially upward to disengage the clutch plates 190 and 193, as shown in Fig. 3.

Clutch plates 190 and 193 together with spring 195 form a steering clutch that must be frictionally engaged, as shown in Fig. 4, in order to transmit motion from steering wheel 26 to actuating lever 191. Movement of lever 191 may then be transmitted to valve spool 140 by means of a motion translating linkage 197, shown in Fig. 9. In this condition it will be apparent that rotational movement of steering wheel 26 displaces valve spool 140 in an axial direction. The steering clutch has been designed with limited torque capacity in order that the operator may overpower or slip the clutch when the auxiliary steering valve spool 140 reaches either end of its stroke. Such an operation occasionally may be required to align steerable front wheels 16 of tractor 12 before disengaging the auxiliary steering mechanism 25.

Linkage 197 includes a link 198 having one end joined to the lever 191 by means of a ball joint 199 and the other end connected by a similar ball joint 200 to one end of the spool lever 201. The opposite end of the lever 201 is pivotally connected on the bottom portion of the housing 112 by means of a pivot pin, not shown. The steering valve spool 140 is connected to lever 201 by means of a pivot joint 204 whereby pivotal movement of lever 201 about its pivot pin displaces valve spool 140 in an axial direction.

Referring to Fig. 3, diagrammatically illustrated air pressure system 206 supplies air under pressure to cylinder 178 for bringing about engagement of clutch plates 190 and 193 in order to connect lever 191 for rotation with manual steering wheel 26. The air pressure system is of the conventional type and includes an engine driven air compressor 207 which supplies compressed air from air tank 209 to a control valve 208 by means of conduits 210. Control valve 208 has two positions, open and closed, and in the latter position directs air into cylinder 178 by means of conduit 211. Valve 208 is actuated by the weight transfer apparatus 171 and is effective to synchronize the operation of apparatus 171 with that of the auxiliary steering mechanism 25, as will be presently explained in detail.

Referring to Fig. 5, weight transfer control mechanism 171 includes a pedal assembly 213 which is pivotally mounted on the floor plate 214 of the tractor 12 by means of bracket 215 and pin 216. Weldment 213 includes a foot pedal plate 218 which is to be controlled by the operator's left foot. A lever portion 219 of the pedal weldment 213 is integral with pedal 218 and extends below the floor plate 214 through a suitable opening therein and pivots about pin 216. Foot pedal 218 is operatively connected with valve spool 164 by means of a thrust transmitting linkage 220 which includes a link member 221 having one end pivotally connected to lever portion 219 by means of a pin 222 and having the opposite end pivotally connected to one end of the spool lever 224 by means of pin 225. The opposite end of lever 224 is pivotally connected on the lower portion of housing 112 by means of a pivot pin 226 which shares a common axis with the pivot pin, not shown, of lever 201. Spool lever 224 is pivotally connected to the weight transfer valve spool 164 by means of pin 227 whereby pivotal movement of lever 224 about pin 225 will displace spool 164 axially within bore 127.

Foot pedal 218 effectively serves also to actuate valve 208 which as previously mentioned regulates air flow to and from air cylinder 178. Valve 208 is mounted below floor plate 214 by means of a support member 229 and is actuated by a cam follower arm 230, one end of which is pivoted on a portion of the valve housing 231 by means of pin 232. This same end of arm 230 has a portion engageable with actuator 233 of the air valve 208. A roller 234 is mounted on the opposite end of arm 230. Roller 234 together with arm 230 serves as a cam follower which is maintained in thrust transmitting engagement with a cam 235 formed on lever portion 219. The cam follower is maintained in engagement with cam 235 by means of a tension spring 236 which interconnects the end of arm 230 adjacent roller 234 and the foot pedal 218. As pedal assembly 213 is pivoted about pin 216, arm 230 will be pivoted about pin 232 thereby manipulating actuator 233 of valve 208. In Fig. 5, for example, actuator 233 is disposed in the closed position; whereas in Figs. 6 through 9 arm 230 has been pivoted downwardly about pin 232 thereby depressing actuator 233 to the open position of valve 208.

Spring 236 is effective to bias pedal assembly 218 to the nonoperating or first position corresponding to the steering "float" weight transfer "float" position of spool 164, as shown in Fig. 5. A projection 237 is formed on the surface of cam 235 and acts as a detent for the cam follower so as to releasably retain pedal assembly 213 in an intermediate control position corresponding to the steering "hold" weight transfer "hold" position of spool 164, as shown in Fig. 8.

*Operation*

Figs. 1, 3 and 5 show the disposition of the steering mechanism 24 and the weight transfer mechanism 170 during operation of the tractor and scraper as a three axle vehicle. In this condition vehicle 11 is being guided by the tractor's dirigible front wheels 16 which are controlled by hand wheel 26. Referring specifically to Fig. 5, arrows drawn within the passages in valve housing 112 indicate that cylinders 64 and 66 of weight transfer jacks 61 and 62 communicate freely with exhaust passage 117 through load port 145 and exhaust port 150; and that both ends of cylinders 93 and 95 of auxiliary steering jacks 90 and 91 communicate freely with the exhaust passage 117 through relay ports 152 and 153, and exhaust ports 151 and 161. In this condition rams 63 and 65 and 94 and 96 are allowed to "float" in their respective cylinders thereby permitting free articulation of the tractor 12 with respect to the scraper 13 about the vertical pivot axis 88, transverse horizontal axis 60 and longitudinal axis 83.

The fluid pressure control system 15 and the steering and weight transfer control apparatus 170 is so designed that the auxiliary wagon type steering system may be engaged without the tractor front wheels being lifted off the ground. It may be desirable to independently activate the auxiliary steering, for example, in order to prevent jackknifing of the tractor and scraper which might occur when operating the vehicle over a slippery roadway.

To activate the auxiliary steering control valve system the operator simply depresses foot pedal 218 until the foot pedal assembly 213 is pivoted to its second position, as illustrated in Fig. 6. In this position cam 235 causes cam follower arm 230 to be pivoted downward thereby depressing actuator 233 which adjusts air valve 208 to its open position. In the open position compressed air is directed through valve 208 and into air cylinder 178 causing piston member 179 to be displaced downwardly against the resistance of spring 195 engaging clutch plate 190 with clutch plate 193. The steering valve spool 140 may now be manipulated by the hand wheel 26.

Pivoting of pedal assembly 213 to the second position, as shown in Fig. 6, also displaces the weight transfer valve spool 164 axially to the right and to its auxiliary steering "hold" weight transfer "float" position wherein relay ports 152 and 153, respectively, are closed from communication with the exhaust passage 117 thereby hydrostatically locking rams 94 and 96 in their respective cylinders 93 and 95. Jacks 90 and 91 are now responsive to the axial adjustment of valve spool 140 which has been automatically placed in a "hold" position by the adjustment of valve spool 164. Jacks 61 and 62, however, are not affected because valve spool 164 remains in a weight transfer "float" position with load port 145 freely communicating with exhaust passage 117.

In the weight transfer "float" auxiliary steering "hold" condition, as illustrated in Fig. 6, the hitch mechanism 14 will permit free articulation of scraper 13 with respect to tractor 12 about the transverse horizontal pivot axis 60 and the longitudinal pivot axis 83. The angular relationship of the tractor with respect to the scraper about vertical pivot axis 88, however, is now positively regulated by means of steering jacks 90 and 91 which are controlled by valve spool 140 which in turn is manipulated by the steering wheel 26.

Upon release of foot pedal 218 from the second position of Fig. 6 the pedal assembly 213 being biased by spring 236 will return to the first position, as shown in Fig. 5. Simultaneously, valve spool 164 will be returned to the auxiliary steering "float" and weight transfer "float" position shown in Fig. 5; and arm 230 will be pivoted upwardly thereby disengaging actuator 233. Disengagement of actuator 233 adjusts air valve 208 to the closed position and allows air cylinder 178 to exhaust to the atmosphere through valve 203 as spring 195 returns piston member 179 thereby disengaging clutch plate 190 and 193.

Should maximum tractive power be required as when operating the vehicle over difficult terrain or during the cutting and loading operation of the scraper, the tractor and scraper may be converted into a two axle vehicle by actuating the weight transfer jacks 61 and 62 in order to raise the tractor front wheels off the ground.

To initiate weight transfer the foot pedal 218 is depressed to the full actuated position, as shown in Fig. 7, which pivots the pedal assembly 213, actuating air valve 208 to "open" and setting off the chain of events which results in rotationally locking the auxiliary steering lever 191 with steering wheel 26, as shown in Fig. 4, as hereinbefore described.

Referring specifically to Fig. 7, valve spool 140 remains in the centered position, as shown in Fig. 5, but the pivoting of pedal assembly 213 has moved valve spool 164 to the extreme right into the weight transfer "raise" position. In the "raise" position pressurized fluid is directed into the weight transfer jacks 61 and 62. In response to the power fluid weight transfer jacks 61 and 62 are contracted whereby the tractor is tilted with respect to the scraper about the horizontal transverse pivot axis 60. As will be apparent, the degree of tilting is under the operator's control; and if necessary, the tractor's front wheels may be raised off the ground as much as thirty inches, as shown in Fig. 2.

Referring to Fig. 8, upon release of the foot pedal 218, spring 236 will return pedal assembly 213 to the intermediate position, which corresponds to a weight transfer "hold" steering "hold" position of valve spool 164. The pedal is retained in this position due to roller 234 engaging projection 237 on cam 235. With valve spool 164 disposed in the weight transfer "hold" position, load port 145 is closed from communication with the exhaust passage 117 which hydrostatically locks jacks 61 and 62 in the desired degree of contraction whereby the tractor may be held in any preselected degree of tilted condition. By retaining valve spool 164 in the weight transfer "hold" position, valve spool 140 is automatically disposed in the auxiliary steering "hold" position with steering jacks 90 and 91 being hydrostatically locked, as was previously explained in connection with Fig. 6.

According to the position of the valve spools and steering lever 191, illustrated in Figs. 6 and 8, vehicle 11 is operating in the straight ahead position with valve spool 164 adjusted so that valve spool 140 is in the auxiliary steering "hold" position. Assuming now that it is necessary to deploy the wagon type auxiliary steering so as to guide the vehicle to the right, steering wheel 26 is turned clockwise, as viewed from the operator's station 23. Movement of steering wheel 26 in this direction simultaneously rotates auxiliary steering lever 191 in a clockwise direction and displaces the steering valve spool 140 to the left and into the "right turn" position, as shown in Fig. 9.

Referring to Fig. 9, in the "right turn" position inlet port 129 is connected for communication with load port 132 so that pressurized fluid is transmitted to the rearward end of cylinder 95 and to the forward end of cylinder 93; and load port 131 is connected with exhaust port 133 so that trapped fluid in the forward end of cylinder 95 and the rearward end of cylinder 93 may be evacuated to the exhaust passage 117. This results in steering jack 91 being expanded and steering jack 90 being contracted. The reactive force of jacks 90 and 91 is transmitted through linkages 99 and 99' to the scraper causing the tractor unit 12 to be angled to the right about the vertical king pin axis 88.

Although Fig. 9 illustrates the maximum ninety degree angled position to the right, it will be apparent that any desired degree of angling is obtainable by simply releasing the hand wheel 26 allowing spring 144 to center spool 140 in the steering "hold" position. This, of course, will hydrostatically lock steering jacks 90 and 91, respectively, in the desired degree of expansion and contraction.

It will readily be apparent that when it is necessary to return the vehicle from the "right turn" position of Fig. 9 to straight ahead operation or to angle the tractor to the left about axis 88, steering wheel 26 is simply turned in a counterclockwise direction. The simultaneous counterclockwise rotation of lever 191 displaces spool valve 140 to the right opening load port 131 for communication with inlet port 128 thereby directing pressurized fluid to the rearward end of cylinder 93 and the forward end of cylinder 95; and connecting load port 132 and exhaust port 134 so that the rearward end of cylinder 95 and the forward end of cylinder 93 communicate with the exhaust passage 117. In this position jack 90 will be expanded and jack 91 will be contracted. If the wheel 26 is held in the left turn position, the tractor unit will swing to the left about pivot axis 88 until it eventually reaches the ninety degree left turn position. Any degree of leftward angling may, of course, be obtained by simply returning valve spool 140 to the "hold" position.

In order to return the vehicle from the two axle tilted condition of Fig. 2 to the three axle condition of Fig. 1 foot pedal 218 is simply returned from the intermediate position of Fig. 9 to the first position of Fig. 5 which moves valve spool 164 to the left and opens cylinders 64 and 66 for communication with the exhaust passage 117, as shown in Fig. 5. Jacks 61 and 62 will now be free to expand as the weight of tractor 12 causes it to pivot downwardly about axis 60 until front wheels 16 are firmly engaged with the ground. As foot pedal 218 is returned to the first position, air valve 208 is automatically closed which disengages the auxiliary steering actuating mechanism so that the three axle vehicle may be guided by the tractor's steerable front wheels 16 under the control of steering wheel 26.

From the foregoing detailed description it will be apparent that a new and useful manually operated vehicle steering and weight transfer control apparatus has been illustrated wherein an auxiliary steering mechanism is coordinated with a weight transfer control mechanism. Manipulation of the weight transfer control foot pedal automatically engages an auxiliary steering mechanism so that both the tractor steerable front wheels and the auxiliary wagon type steering system may be operated by the same hand steering wheel. This apparatus together with appropriate control valving enables an operator to rapidly convert tractor 12 and scraper 13 from a thee axle vehicle to a two axle vehicle and to exercise complete and positive steering control throughout the conversion.

Also the foot pedal and hand steering wheel arrangement will be readily familiar to any driver who has had experience operating a conventional automotive type vehicle.

It is to be understood that this invention is not to be limited to the particular sequence of control positions of apparatus 170. The sequence disclosed is merely a convenient one which complements the particular control valving that has been selected to illustrate the invention.

It is to be understood further that although only one embodiment of the invention has been described, it is not intended to limit any patent granted hereon otherwise than is necessitated by the scope of the appended claims.

Having now particularly described and ascertained the nature of my said invention and the manner in which it is to be performed, I declare that what I claim is:

1. A steering control mechanism for a motor vehicle comprising a support; a manually controlled steering shaft rotatably connected on said support; motion translating means for interconnecting said steering shaft with a steerable ground wheel of the vehicle; a first clutch member rotatable with said steering shaft; a driven clutch member complementary to and engageable with said first clutch member; an auxiliary steering control lever connected for rotation with said driven clutch member; and an expansible and contractible fluid motor means reacting between said supporting and one of said clutch members for moving the latter axially into frictional engagement with the other of said clutch members thereby connecting said auxiliary steering lever for rotation with said steering shaft.

2. The combination set forth in claim 1 wherein said driving and driven clutch members and said fluid motor means are all coaxial with said steering shaft.

3. The combination set forth in claim 2 wherein said driven clutch member is connected in thrust transmitting relationship with said piston member.

4. A steering control mechanism for a motor vehicle comprising a support; a manually rotatable steering shaft rotatably attached on said support; motion translating means carried on said support for interconnecting said steering shaft with a steerable ground wheel of the vehicle; a driving clutch member coaxial with and rotationally carried on said steering shaft; a driven clutch member rotatably mounted on the support and being complementary to and engageable with said driving clutch; an auxiliary steering control lever rotationally connected with said driven clutch member; a fluid motor cylinder on said support and coaxial with said steering shaft; a piston member slidable within said cylinder and in thrust transmitting relationship with one of said clutch members, one of said clutch members being moved axially by said piston into frictional engagement with the other of said clutch members thereby connecting said auxiliary steering lever for rotation with said steering shaft.

5. A steering control mechanism for a motor vehicle comprising a support housing; a manually controlled steering shaft rotatably carried on said support housing; motion translating means for interconnecting said shaft with a steerable ground wheel; a first clutch member coaxial with and rotationally carried on said steering shaft; a fluid motor cylinder formed by the interior walls of said support housing coaxial with said steering shaft; a piston member slidable within said cylinder; a driven clutch member rotationally carried within said support housing and being complementary to and engageable with said first clutch member; an auxiliary steering control lever rotatably carried on said driven clutch member, said driven clutch member to be moved by axial movement of said piston into frictional engagement with said first clutch member thereby connecting said auxiliary steering lever for rotation with said steering shaft.

6. In a self-propelled articulated earth moving vehicle of the type including a two axle tractor unit having a main frame and steerable front wheels, a single axle trailing unit, weight transfer means interposed between said units for converting said vehicle into a two axle unit, and an auxiliary wagon type steering system for controlling the horizontal angular relationship between said tractor and trailing units; a steering mechanism comprising: a support housing carried on the tractor main frame; a manually rotatable steering shaft having one end journaled in said housing; means for steerably connecting said one end of said shaft with the tractor's steerable front wheels; a driving clutch member rotationally fixed in coaxial relationship on said shaft; a driven clutch member rotatably carried within said housing and being complementary to and engageable with said driving clutch member; a lever for actuating said auxiliary wagon type steering system and being rotationally connected with said driven clutch member; expansible and contractible fluid motor means coaxial with said shaft and reacting between said support housing and one of said clutch members whereby expansion of said motor means urges said one clutch member in one axial direction into frictional engagement with the other of said clutch members thereby connecting said steering lever for rotation with said steering shaft; fluid pressure means including a control valve for directing pressure fluid into said fluid motor means to expand the latter; a manual control lever for operating said weight transfer control system; and thrust transmitting means for transmitting movement of said control lever to actuate said control valve whereby pressure fluid is directed into said fluid motor.

7. In a self-propelled articulated earth moving vehicle of the type including a two axle tractor unit having a main frame and steerable front wheels, a single axle trailing unit, weight transfer means interposed between said units for converting said vehicle into a two axle unit, and an auxiliary wagon type steering system for controlling the horizontal angular relationship between said tractor and trailing units; a vehicle steering and weight transfer control apparatus comprising: a housing carried on the tractor main frame; a manually rotatable steering shaft having one end journaled in said housing; means for steerably connecting said shaft with said steerable wheels; a first clutch member rotationally carried in coaxial relationship on said shaft; a fluid pressure cylinder formed by the interior walls of said housing in coaxial relationship with said shaft; a piston member slidable within said cylinder; a driven clutch member rotatably carried on and in axially fixed relationship with this piston; an auxiliary steering lever rotationally fixed to said second clutch member; a fluid pressure system including a control valve being operative to direct pressurized fluid into said fluid pressure cylinder for displacing said piston and frictionally engaging said clutch members; and a foot pedal pivotally carried on said tractor for selectively actuating said weight transfer means; and thrust transmitting means for transmitting movement of said foot pedal to actuate said control valve whereby said auxiliary steering lever is rotationally connected with said manual steering shaft upon actuation of the weight transfer system.

8. In an articulated self-propelled earth moving vehicle of the type including a two axle tractor unit having a main frame and steerable front wheels, a single axle trailing unit, weight transfer means interposed between said units for converting said vehicle into a two axle unit, and auxiliary steering means for controlling the horizontal angular relationship between said tractor and trailing units, a vehicle steering and weight transfer control apparatus comprising: a steering mechanism including a housing carried on the tractor main frame; a manually rotatable steering shaft having one end journaled in said housing; means for steerably connecting said shaft with said steerable front wheels; a first clutch member rotationally fixed in coaxial relationship on said shaft; a fluid motor cylinder in fixed relationship with said housing and coaxial with said shaft; a piston member slidable within said cylinder; and a driven clutch member rotatably carried on and in axially fixed relationship with said piston; an auxiliary steering lever rotationally fixed on said driven clutch member, axial displacement of said piston in one direction moves said driven clutch member into frictional engagement with said first clutch member thereby connecting said auxiliary steering lever for rotation with said steering shaft; a fluid pressure means including a control valve for controlling said piston, said valve being shiftable from a normally closed position into an open position for directing pressurized fluid into said cylinder to move said piston axially in said one direction; and an actuating mechanism for said weight transfer means including a manually operable lever pivotally carried on said tractor, said lever being pivotable from a nonoperating position into a first position, a camming portion formed on said lever, a cam follower having one end in thrust transmitting engagement with said cam portion and the other end operatively connected to said control valve, whereby movement of said lever to said first position automatically adjusts the control valve to said open position.

9. In an articulated self-propelled three axle earth moving vehicle of the type including a two axle tractor unit having a main frame and steerable front wheels, a single axle trailing unit, weight transfer means interposed between said units for converting said vehicle into a two axle unit, and auxiliary steering means for controlling the horizontal angular relationship between said tractor and trailing units, a vehicle steering and control apparatus comprising: a steering mechanism including a support housing carried on the tractor; a manually rotatable steering shaft having one end journaled in said support housing; means for steerably connecting said shaft with the steerable tractor wheels; a driving clutch member fixed in coaxial relationship on said steering shaft; a fluid motor cylinder formed by the interior walls of said support housing in coaxial relationship with said shaft, a piston member slidable within said cylinder, a driven clutch member rotationally carried on and in axially fixed relationship with said piston; a steering lever for actuating said auxiliary steering means being rotationally fixed on said driven clutch member, displacement of said piston in one axial direction moves said driven clutch member into frictional engagement with said driving clutch member thereby connecting said auxiliary steering lever for rotation with said steering shaft; spring means for biasing said driven clutch out of engagement with said driving clutch; a fluid pressure means including a control valve for directing pressurized fluid into said cylinder to displace said piston in the axial direction against the biasing force of said spring means, said valve being shiftable from a normally closed position to an open position; and a foot pedal assembly for selectively actuating said weight transfer means including a foot pedal pivotally carried on said tractor, said foot pedal being pivotable from a nonoperative position into a raise position wherein said weight transfer means are actuated to raise the steerable tractor wheels off the ground, and a hold position to maintain the tractor wheels in a raised condition out of steering engagement with the ground; a camming portion on said foot pedal assembly; a cam follower having one end in thrust transmitting engagement with said cam portion and the other end operatively connected to said valve, upon movement of said foot pedal into either of said raise and hold positions said valve being automatically actuated to an open position.

10. The combination set forth in claim 9 wherein a detent means is provided on said cam portion and being engageable with said cam follower to releasably maintain said foot pedal assembly in the hold position.

11. The combination set forth in claim 10 wherein the hold position is between the nonoperating and raise positions, and wherein a spring means is provided for biasing said foot pedal from the raise position to the hold position.

12. The combination set forth in claim 11 wherein said foot pedal is provided with a first position intermediate said hold and nonoperating positions, in said first position only said control valve is activated to the open position without operating the weight transfer means, said foot pedal being biased by said spring means from the first position to the nonoperating position.

References Cited in the file of this patent
UNITED STATES PATENTS

| | | |
|---|---|---|
| 2,374,410 | Brumbaugh | Apr. 24, 1945 |
| 2,885,022 | Rockwell | May 5, 1959 |